(12) United States Patent
Delaney

(10) Patent No.: US 11,777,924 B2
(45) Date of Patent: *Oct. 3, 2023

(54) CROSS CHAT SESSION AUTHENTICATION

(71) Applicant: PayPal, Inc., San Jose, CA (US)

(72) Inventor: Jennifer Esmeralda Delaney, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,741

(22) Filed: Feb. 26, 2022

(65) Prior Publication Data

US 2022/0182377 A1   Jun. 9, 2022

Related U.S. Application Data

(63) Continuation of application No. 16/742,864, filed on Jan. 14, 2020, now Pat. No. 11,329,977, which is a
(Continued)

(51) Int. Cl.
*H04L 27/06* (2006.01)
*H04L 9/40* (2022.01)
(Continued)

(52) U.S. Cl.
CPC ..... *H04L 63/0838* (2013.01); *G06Q 20/3821* (2013.01); *G06Q 20/401* (2013.01); *H04L 63/0853* (2013.01)

(58) Field of Classification Search
CPC ............ H04L 63/0838; H04L 63/0853; G06Q 20/401

See application file for complete search history.

(56) References Cited

U.S. PATENT DOCUMENTS 7,603,413 B1   10/2009  Herold et al.
2014/0279050 A1*  9/2014  Makar ................. G06F 16/9535
                                                    705/14.66
(Continued)

OTHER PUBLICATIONS

Pereira et al., "Leveraging chatbots to improve self-guided learning through conversational quizzes", TEEM '16: Proceedings of the Fourth International Conference on Technological Ecosystems for Enhancing Multiculturality, November (Year: 2016).*

(Continued)

*Primary Examiner* — Morshed Mehedi
(74) *Attorney, Agent, or Firm* — Haynes and Boone, LLP

(57) ABSTRACT

A method for authentication of chat bots includes determining that a first chat bot is authenticated, by a server, for first session communication at a first chat session with a first chat application instance. The first chat session is hosted by a first chat service. The method includes determining authentication intent to authenticate, with the server, a second chat bot for a second session communication at a second chat session with a second chat application instance. The second chat session is hosted by a second chat service, where the first chat bot and the second chat bot simulate respective chat application instances. The method also includes providing authentication credentials, via the first chat session, to authenticate the second chat bot with the server for the second session communication.

20 Claims, 5 Drawing Sheets

Related U.S. Application Data continuation of application No. 15/706,238, filed on Sep. 15, 2017, now Pat. No. 10,536,452.

(51) Int. Cl.
    *G06Q 20/40*    (2012.01)
    *G06Q 20/38*    (2012.01)

(56) References Cited

U.S. PATENT DOCUMENTS

| | | | |
|---|---|---|---|
| 2014/0359027 A1* | 12/2014 | Pujare | H04L 51/56 709/206 |
| 2014/0365520 A1 | 12/2014 | Pujare et al. | |
| 2015/0371173 A1* | 12/2015 | Jalali | G06Q 20/386 705/7.14 |
| 2017/0048170 A1 | 2/2017 | Smullen et al. | |
| 2017/0180284 A1 | 6/2017 | Smullen et al. | |
| 2017/0250930 A1* | 8/2017 | Ben-Itzhak | G06F 3/0488 |
| 2017/0366479 A1 | 12/2017 | Ladha et al. | |
| 2018/0137401 A1 | 5/2018 | Kumar et al. | |
| 2018/0152411 A1 | 5/2018 | Lee et al. | |
| 2018/0332042 A1* | 11/2018 | Yu | H04W 12/06 |

OTHER PUBLICATIONS

Abdul-Kader A.S., et al., "Survey on Chatbot Design Techniques in Speech Conversation Systems," International Journal of Advanced Computer Science and Applications (IJACSA), vol. 06, No. 07, 2015, 9 pages.

Deshmukh S.S., et al., "Classification of Human and Chat Bot for Server Side Security," International Journal of Computer Science and Information Technology Research, vol. 03, Issue. 02, Apr.-Jun. 2015, 5 pages.

Gianvecchio S., et al., "Humans and Bots in Internet Chat: Measurement, Analysis, and Automated Classification", IEEE/ACM Transactions on Networking, vol. 19, No. 5, Oct. 2011, 15 pages.

Gu G., et al., "Active Botnet Probing to Identify Obscure Command and Control Channels", 2009 Annual Computer Security Applications Conference, IEEE Computer Society, 2009, 13 pages.

Hess A., et al., "Content-Triggered Trust Negotiation", ACM Transactions on Information and System Security, vol. 07, No. 03, Aug. 2004, 29 pages.

Setiaji B., et al., "Chatbot Using a Knowledge in Database, Human-to-Machine Conversation Modeling", 7th International Conference on Intelligent Systems, Modelling and Simulation, 2016, 6 pages.

\* cited by examiner

CROSS CHAT SESSION AUTHENTICATION

CROSS REFERENCE TO RELATED APPLICATIONS

This application is a continuation application of U.S. patent application Ser. No. 16/742,864, filed Jan. 14, 2020, which is a continuation of U.S. patent application Ser. No. 15/706,238, filed Sep. 15, 2017 and issued Jan. 14, 2020 as U.S. Pat. No. 10,536,452 and are incorporated by their reference in their entirety.

BACKGROUND

Embodiments of the inventive subject matter generally relate to the field of communication systems and, more particularly, to communicating in chat sessions using chat bots.

Chat sessions facilitate communication between chat applications in a communication system. A user of a chat application can communicate, over a communication network, with a user of another chat application by transmitting communication to, and receiving communication from, the chat session. A chat bot can simulate a chat application to communicate with other chat applications using the chat session. The user can also have an account at a transaction server. The chat bot can be authenticated to access the user's account at the transaction server. However, authenticating additional chat bots at other chat sessions to access the user's account at the transaction server can be difficult. If access to own user account via other chat sessions is tedious and overly complicated, that may discourage the user from using other chat sessions.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
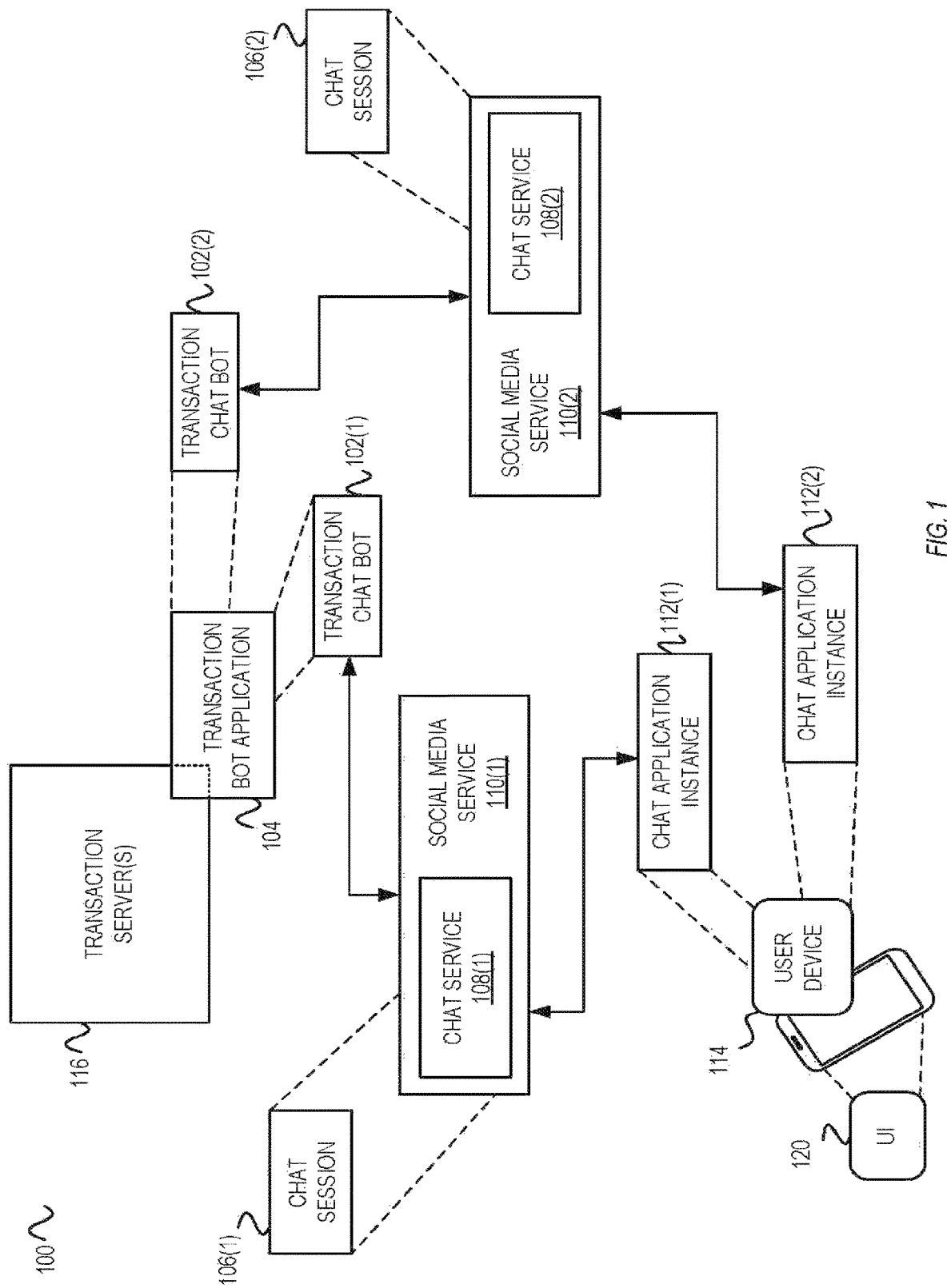
FIG. 1 is a system diagram illustrating embodiments of a communication system where chat bots communicate with chat application instances over multiple chat sessions.

The description that follows includes exemplary systems, methods, techniques, instruction sequences and computer program products that embody techniques of the present inventive subject matter. However, it is understood that the described embodiments may be practiced without these specific details. For instance, although some examples refer to social media services, other types of media services are contemplated, such as interactive comment sections of online news services or of other online services.

Chat sessions facilitate communication between instances of chat applications running on various devices in a communication system. A user of one instance of a chat application can communicate, over the communication system, with a user of another instance of a chat application by transmitting and receiving communication to/from the chat session. For example, the communication system facilitates the transmission of chat texts, over a communication network, between the instances of the chat applications and the chat session. The chat session, which can be hosted by a chat service, can facilitate communication between the multiple instances of the chat applications. Each chat application, such as a SLACK chat application, or a FACEBOOK MESSENGER application, can be hosted by a user device. The user device can be any type of a personal device such as a mobile phone, tablet, or other computing device.

In some cases, the communication may be between multiple instances of the same type of chat application. In other cases, the communication may involve instances of multiple different types of chat applications. Furthermore, the user can use multiple chat applications on the user device, substantially at the same time. The user device can allow multitasking execution of several applications, each of which can be in a different execution state. An application that is open on the user device is an application that can be in a running state, in a suspended/waiting state, in a blocked state, etc. Thus, the user device can have multiple chat applications open. For example, an instance of the SLACK chat application can be open in a running state on the user device, and an instance of the FACEBOOK MESSENGER chat application can be open in a suspended state on the same user device. One of the chat applications instances can be executing in a web browser on the user device, instead of as a stand-alone application.

Multiple SLACK chat application instances can communicate with each other by transmitting chat texts to, and receiving chat texts from, a SLACK chat session. The chat service can be a part of a social media service. For example, the chat service can be a SLACK chat service that is a part of a SLACK team collaboration tool, or a FACEBOOK MESSEGENGER chat service that is a part of a FACEBOOK social networking service. The chat service itself can be further hosted by a server or another type of a computing device. The user device can thus communicate (via separate chat application instances) with multiple chat sessions, each one being hosted by a different chat service.

A bot application can communicate, via a chat bot, with the chat session and simulate a chat application instance for communicating with the other chat application instances. The chat bot can send and receive chat texts from the chat session. For example, one bot application may simulate a SLACK chat application instance for communicating, using a SLACK chat bot via a SLACK chat session, with other SLACK chat application instances. Another bot application may simulate a FACEBOOK MESSENGER chat application instance for communicating, using a FACEBOOK MESSENGER chat bot via a FACEBOOK MESSENGER chat session, with other FACEBOOK MESSENGER chat application instances.

The user may have access to a chat session via a chat application instance. A method for authentication of chat bots includes determining that a first chat bot is authenticated, by a server, for first session communication at a first chat session with a first chat application instance. The first chat session is hosted by a first chat service. The method includes determining authentication intent to authenticate, with the server, a second chat bot for a second session communication at a second chat session with a second chat application instance. The second chat session is hosted by a second chat service, where the first chat bot and the second chat bot simulate respective chat application instances. The method also includes providing authentication credentials, via the first chat session, to authenticate the second chat bot with the server for the second session communication.

In some embodiments, the user can communicate, over a new chat session, with a chat bot (referred to as the new chat bot) that has not yet been authenticated to access the user's account. The bot application that hosts the new chat bot can determine whether the user uses another chat bot, at another chat session, that has been authenticated to access the user's account at the transaction server. Once the bot application determines the authenticated chat bot, the authenticated bot application can provide, via the another chat session, authentication credentials for authentication of the new chat bot. These authentication credentials can be used to authenticate the new chat bot at the new chat session to access the user account at the transaction server.

For frictionless operation, the user has the ability to leverage communication with an authenticated chat bot to authenticate additional chat bot(s) in additional chat sessions. For example, the user can communicate with an authenticated SLACK chat bot to access a user account at the transaction server. The user can also communicate with a new FACEBOOK MESSENGER chat bot, which has not been yet authenticated. The user can use the SLACK chat bot to facilitate authentication of the FACEBOOK MESSENGER chat bot for accessing the user account at the transaction server. The user does not need to separately login and/or provide a password for the FACEBOOK MESSENGER chat bot for use with the transaction server. In some embodiments, the chat application instances on the user device do not need to be placed in a different execution state when performing the authentication. In some embodiments, when performing the authentication, only the two chat application instances are used on the user device, without using additional applications. Providing of additional login and/or password information, or using additional applications can create friction, and also be insecure as the login and/or password information can be accessed by fraudulent entities. The following description, and associated Figures, illustrates various embodiments directed to the ideas listed above.

FIG. 1 is a system diagram 100 illustrating some embodiments of a communication system where chat bots communicate with chat application instances over multiple chat sessions. In an overview of the system diagram 100, a transaction bot application 104 hosts both a transaction chat bot 102(1) and a transaction chat bot 102(2). The bot application 104 communicates using separate chat sessions—via the transaction chat bot 102(1) with a chat session 106(1), and via the transaction chat bot 102(2) with a chat session 106(2). Each of the transaction chat bots 102(1) and 102(2) is associated with a single respective chat session.

The chat sessions 106(1) and 106(2) are hosted by separate chat services 108(1) and 108(2), respectively. For example, the chat service 108(1) can be implemented by SLACK, and the chat service 108(2) can be implemented by FACEBOOK MESSENGER. The chat services 108(1) and 108(2) can be hosted by social media services 110(1) and 110(2), respectively. For example, the FACEBOOK MESSENGER chat service 108(2) can be hosted by FACEBOOK social media service 110(2).

The transaction chat bots 102(1) and 102(2) (also referred to as "chat bots" 102(1) and 102(2)) can each simulate respective chat application instances when communicating, via the chat sessions 106(1) and 106(2), with the chat application instances 112(1) and 112(2), respectively. The chat application instances 112(1) and 112(2) can communicate with other chat application instances (not shown) via the chat session 106(1) and 106(2), respectively. For example, the chat application instance 112(1) can transmit a chat text to the chat session 106(1), where this chat text can be accessed by other chat application instance(s). The chat application instances 112(1) and 112(2) can be hosted by a user device 114.

The user device 114 can also display a user interface (UI) 120. The UI 120 can display visual elements, such as chat texts of the chat sessions 106(1) and 106(2). The UI 120 can also receive input from the user. It is noted that the user device 114 can also receive input from the user via other input elements, such as via a keyboard, mouse, microphone (e.g., from a voice command), among others.

The bot application 104 can interface with a transaction server 116 to provide instructions to the transaction server 116 and receive transaction information regarding users and/or user accounts from the transaction server 116. For example, the transaction server 116 can provide financial services, such as a fund transfer (e.g., a transfer of a certain monetary amount), to users. The transaction server 116 can include transaction accounts, each of which can be associated with a user. The transaction server 116 can facilitate a fund transfer from the user transaction account to a merchant payment account, (i.e., associated with a merchant and in response to instructions received from the transaction bot application 104(1)). The transaction server 116 can be implemented by PAYPAL or another online transaction system that allows users to send, accept, and request fund transfers.

It is noted that although some examples refer to using the transaction server 116, the transaction bot application 104, and the transaction chat bots 102(1) and 102(2) for payment transactions, the transaction server 116 can process general transactions for the user account. For example, the transaction server 116 can be implemented by a Software as a Service (SaaS) server that provides software services for the user device 114 of the user. The chat application instances 112(1) can then be used to access the user account at the SaaS server to provide software services for the user device 114. In some implementations, the transaction server 116 can interface with one or more financial institutions (not shown). The financial institutions can provide financial services to users. The financial institutions 118 can be implemented as banks, credit unions, other deposit-taking institutions that accept and manage deposits and make loans, and other financial service providers. In some embodiments, the financial institutions can include credit card networks, e.g., for funding transfer of money between users.

In one embodiment, the transaction bot application 104 can be implemented as a part of the transaction server 116. The server can be implemented on a single computing device, or on multiple computing devices (e.g., using distributed computing devices or a cloud service). In another embodiment, the transaction bot application 104 is separate from the transaction server 116. The transaction bot application 104 can instantiate the chat bot 102(1), as well as the chat bot 102(2). The transaction bot application 104 can access, via the chat bot 102(1), chat texts that are provided to the chat session 106(1) by the chat application instance 112(1). Similarly, the transaction bot application 104 can access, via the chat bot 102(2), chat texts that are provided to the chat session 106(2) by the chat application instance 112(2). Although FIG. 1 shows a single bot application 104, the transaction server 116 can host several transaction bot applications, e.g., a separate transaction bot application for each of the chat bots 102(1) and 102(2).

A service or an application (such as the transaction bot application 104) can be hosted by a combination of software and hardware. It is noted that the same term "hosting" is used herein to describe both software hosting and hardware hosting. When software hosting, a software service such as the chat service 108, can instantiate and manage multiple chat sessions, such as the chat session 106 and other chat sessions. When hardware hosting, a computing device (such as a server or a user device) can provide resources such as memory, communication, and execution resources for execution of instructions.

The examples presented herein include the chat bot 102 (1) being authenticated to access the user account at the transaction server 116. The chat bot 102(2) is initially not authenticated to access the user account at the transaction server 116. The chat sessions 106(1) and 106(2) are hosted by different chat services 108(1) and 108(2). Thus, the authenticated chat bot 102(1) does not have access to the chat session 106(2) at another chat service 108(2). Instead, the chat bot 102(2) needs to be authenticated for accessing the user account based on communication at the chat session 106(2). The authenticated chat bot 102(1) can be used to provide authentication credentials to the chat session 106(1). The authentication credentials can be accessed via the chat application instance 112(1) to authenticate the chat bot 102(2). The authentication of the chat bot 102(2) can be performed by the transaction server 116, or by another server (e.g., an authentication server). For frictionless operation, the user can authenticate multiple chat bots based on authentication credentials received from an authenticated chat bot, where each of the chat bots is hosted by a different chat service.

Figure 2:
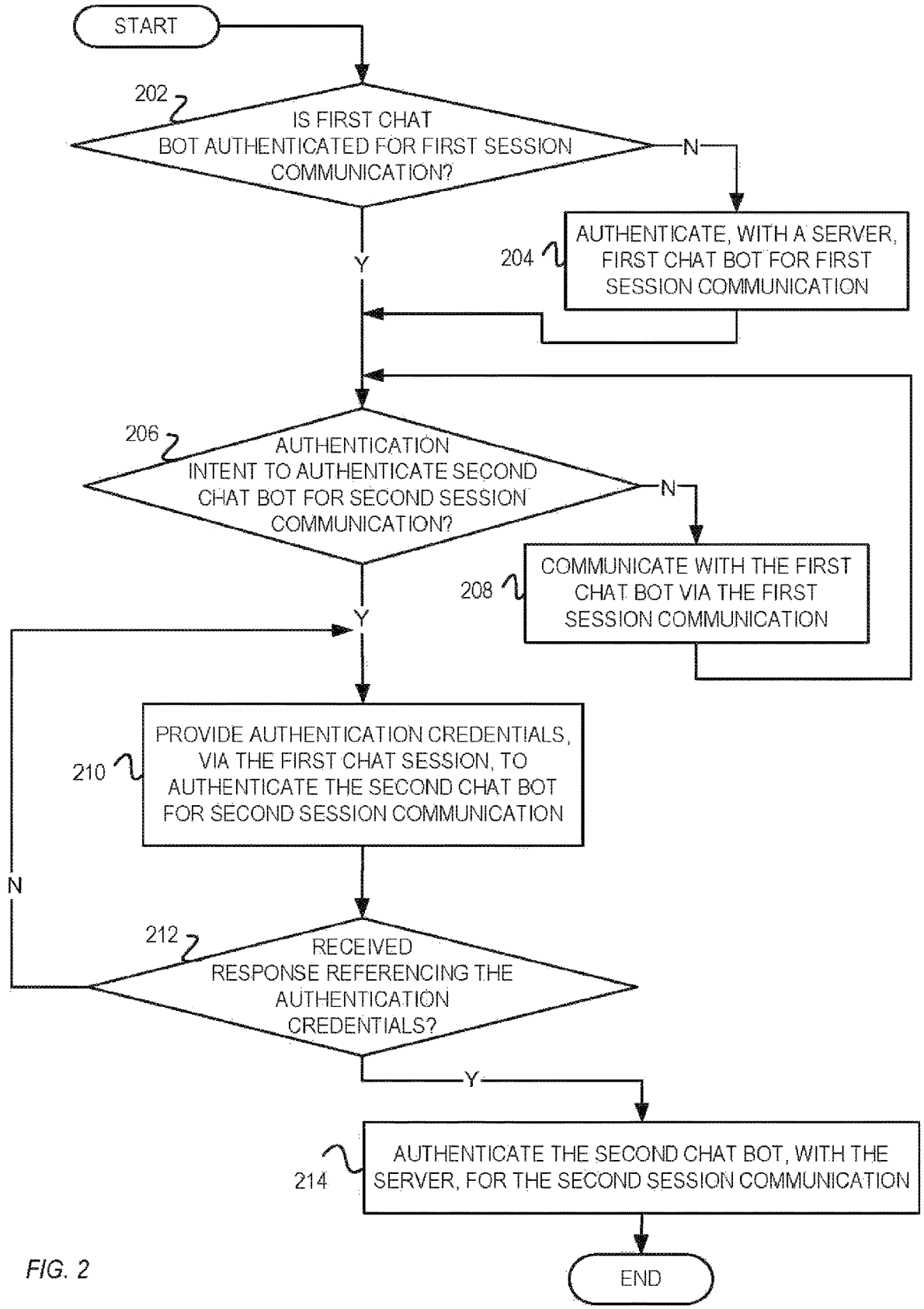
FIG. 2 is a flow diagram illustrating embodiments of operations for authentication of an additional chat bot at an additional chat session.

FIG. 2 is a flow diagram illustrating embodiments of operations for accessing chat session communication for transactions between chat bot applications. The method of FIG. 2 is described with reference to the systems and components described in FIG. 1 (for illustration purposes and not as a limitation). The example operations can be carried out by the transaction bot application 104 and/or by the transaction server 116. It is noted that communication via chat sessions can be accessed (e.g., transmitted and/or received) by the transaction bot application 104 via a respective chat bot from the transaction chat bots 102(1) and 102(2).

Beginning with 202, the bot application determines whether a first chat bot is authenticated, by a server, for first session communication at a first chat session with a first chat application instance. With reference to FIG. 1, the bot application 104 determines whether the chat bot 102(1) is authenticated for session communication at the chat session 106(1) with the chat application instance 112(1). The session communication includes communication that accesses an account, of the user, at the transaction server 116. If the first chat bot is authenticated, the flow proceeds to 206. If the first chat bot is not authenticated, the flow proceeds back to 204.

The bot application 104 can determine authentication of the transaction chat bot 102(1) by communicating with the transaction server 116. The bot application 104 can determine the authentication by accessing a database that stores data entries indicating authentication of transaction chat bots with various chat sessions and/or chat application instances. For example, in some embodiments, the transaction chat bot 102(1) can be authenticated for accessing user accounts of multiple users that communicate using respective chat application instances via the chat session 106(1). Thus, the database can indicate that the transaction chat bot 102(1) can be authenticated for multiple session communications over the chat session 106(1).

At 204, the bot application authenticates, with the server, the first chat bot for first session communication. With reference to FIG. 1, the bot application 104 authenticates, with the transaction server 116, the transaction chat bot 102(1) for first session communication, i.e., for communication accessing an account of the user at the transaction server 116 via the chat session 106(1). The authentication of the first session communication can be configured for a certain duration, and only for communication between the chat bot 102(1) and the chat application instance 112(1) over the chat session 106(1).

Figure 3:
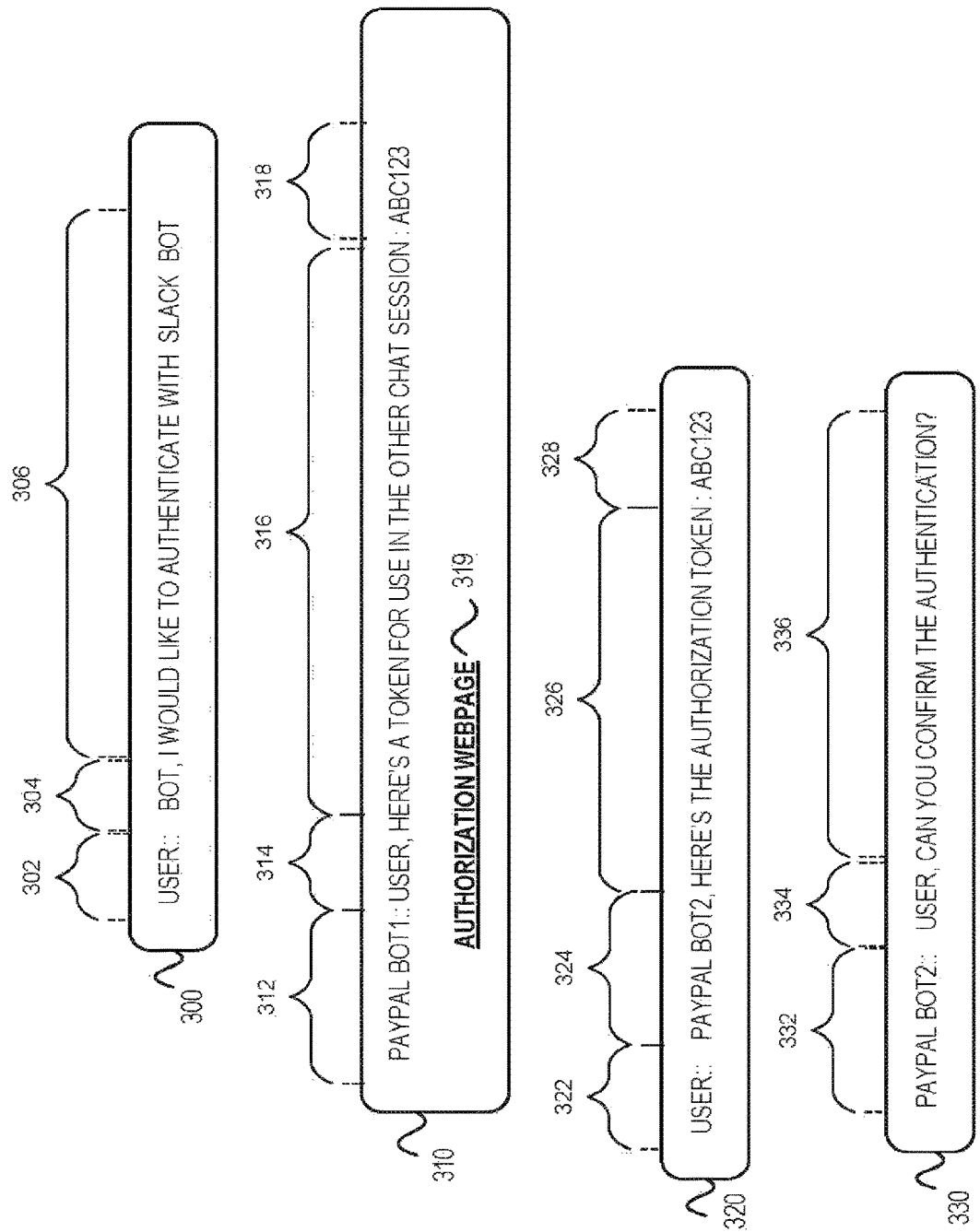
FIG. 3 illustrate embodiments of communication, via chat sessions, for authentication of the additional chat bot.

At 206, the bot application determines authentication intent to authenticate the second chat bot for second session communication. With reference to FIG. 1, the bot application 104 can determine the authentication intent (for authenticating the chat bot 102(2)) based on chat texts received at the chat session 106(1) and accessed via the chat bot 102(1), or based on chat texts received at the chat session 106(2) and accessed via the chat bot 102(2). FIG. 3 shows one example of a chat text at 300 that can be accessed by the bot application 104 to make this determination. In some embodiments, based on the chat texts, the bot application 104 can also determine whether the chat application instances 112(1) and 112(2) are hosted by the same user device. If the bot application determines the authentication intent, the flow proceeds to 210. If the bot application does not determine the authentication intent, the flow proceeds to 208 and then back to 206. At 208, the bot application continues to communicate with the first chat bot via the first session communication.

At 210, the bot application provides authentication credentials, via the first chat session, to authenticate the second chat bot for the second session communication. With reference to FIG. 1, the bot application 104 can provide, via communication provided by the chat bot 102(1) to the chat session 106(1), the authentication credentials. The authentication credentials can be used by an authenticating server (such as the transaction server 116 or by a stand-alone server) to authenticate the chat bot 102(2) for session communication at the chat session 106(2) with the chat application instance 112(2). Once the chat bot 102(2) is authenticated, the chat application instance 112(2) can provide chat texts (to the chat session 106(2)) that once accessed by the chat bot 102(2) and then processed by the bot application 104, can instruct the bot application 104 to access the user account at the transaction server 116.

In some embodiments, the authentication credentials can be a one-time token for use at the second chat session 106(2). As shown in the example of FIG. 3, the chat bot 102(1) can provide, via the chat text 310, a one-time token at 318. The chat application instance 112(1) can access the one-time token. The one-time token can then be communicated to the chat session 106(2) via the chat application instance 112(2). For example, the one-time token can be automatically copied, at the user device 114, from the chat application instance 112(1) (i.e., as accessed from the chat session 106(1)) to the chat application instance 112(2) (i.e., to be provided to the chat session 106(2)). In one implementation, the user of the user device can copy the one-time token between the different chat application instances. In these examples, either the user device or the user can affect the execution state of the chat application instances 112(1) and 112(2) based on the type of authentication credential that is received.

In some embodiments, the authentication credentials can include a link for authenticating the second session communication. The link can be for accessing an authentication web page at the authentication server. In some embodiments, the link can reference the chat bot 102(2) and/or the chat session 106(2). In some embodiments, the link can be a deep link that is accessed from the chat application instance 112(1) for accessing the chat application instance 112(2) on the user device 114. Once linked to the chat application 112(2), the deep link can be used (e.g., by the user device 114) to generate a new chat text for use by the chat application instance 112(2). The new chat text can be a response (that references the authentication credentials) that, when provided to the chat session 106(2), is accessed by the transaction server (or an authentication server) to authenticate the chat bot 102(2).

In some embodiments, the transaction server 116 can initiate authentication of the chat bot 102(2). The authentication credentials provided by the transaction chat bot 102(1) to the chat session 106(10 can include a prompt for confirmation of the authentication of the chat bot 102(2). The prompt can indicate a request for confirmation of the authentication process (i.e., of authenticating the chat bot 102(2)) via the chat session 106(2). Example of the prompt for authentication is shows at chat text 330.

In some embodiments, the bot application 104 can determine what type of authentication credentials to provide. The authentication credential type selection can be based on a variety of criteria, including on a type of chat sessions being used and/or whether the user device is a mobile device (which can be determined based on the chat texts accessed in the chat session 106(1) and/or 106(2)). For example, the bot application 104 can determine that for the chat session 108(1), a link for authentication is provided. The bot application 104 can determine that the one-time token can be provided only if the user device is a mobile device.

In some embodiments, the bot application 104 can determine which chat bot to use for providing the authentication credentials of 210 (and also for receiving the response of 212). For example, if a third chat bot is also authenticated to access the user account at the transaction server 116, the bot application 104 can determine whether to select the chat bot 102(1) or to use the third chat bot for providing of the authentication credentials. The chat bot selection can be based on a variety of criteria, including whether the user device 114 is a mobile device (which can be determined based on the chat texts accessed in the chat session 106(1) and/or 106(2)). For example, the third chat bot is used when communicating with mobile devices. The chat bot selection can be based on security aspects of the chat session 106(1) versus a third chat session used by the third chat bot, where the chat session 106(1) is determined to provide better security. The chat bot selection can also be affected by the type of authentication credentials being used. In one embodiment, the bot application 104 can determine that multiple chat bots need to be used to authenticate the second chat bot. For example, the bot application can provide the authentication credentials via the chat bot 102(1), but the response at 212 is received via the third chat bot.

At 212, the bot application determines whether it has received a response referencing the authentication credentials. With reference to FIG. 1, the bot application 104 can access, via the chat bot 102(2), chat text(s) at the chat session 106(2) to determine whether a response has been provided that references the authentication credentials. Depending on the type of the authentication credentials, the response will vary. The response can be the one-time token that was initially provided at the chat session 106(1). The response can be authentication received from a web page linked by the link. The response can be a confirmation of the authentication process that was referenced by at the chat session 106(1). Depending on the response, the bot application 104 can determine whether the first chat application instance and the second chat application instance are both hosted by the same user device.

At 214, the bot application authenticates the second chat bot, with the server, for the second session communication. With reference to FIG. 1, the transaction server 116 can authenticate the chat bot 102(2) for communication with the chat application instance 112(1) that accesses the user account. In some embodiments, at 214 the bot application 104 can move a transaction session from the first session communication to the second session communication. The transaction session can be for a transaction between the user account at the transaction server 116 and an account associated with another server. For example, the bot application can move the transaction session from the chat session 106(1) to the chat session 106(2).

FIG. 3 illustrates embodiments of communication, via chat sessions, for authentication of the additional chat bot. Chat text 300 illustrates a chat text that can be provided, by the chat application instance 112(1), to the chat session 106. The chat text 300 can be accessed, via the chat bot 102(1), from the chat session 106. The chat text 300 includes chat text portions (also referred to as "portions") 302-308. The bot application 104 can access, via the chat bot 102(1), the chat text 300 and parse the various portions 302-306, such as to determine whether the chat text 300 indicates authentication intent. The portion 302 of "user:" indicates that the chat application instance 112(1) is transmitting the chat text 300. The portion of "Bot" 304 indicates that the chat text 300 is addressed to the chat bot 102(1). The portion 306 of "I would like to authenticate with SLACK bot" indicates authentication intent by the user of the chat application instance 112 for authenticating the chat bot 102(2).

The chat text 310 can include portions 312-319. As indicated by 312, the bot application 104(1) can transmit, via the chat bot 102(1) (named "PayPal Bot 1" in this example), the chat text 310 to the chat session 106(1). The chat text 310 includes examples of authentication credentials. In the depicted example, the portion 314 of "user" indicates that chat text 310 is addressed to the user. The portion of 316 indicates that the token is presented at 318. However, the portions 318 and 319 are provided as an example only, and may vary based on a type of authentication credentials being provided at the chat text 310. For example, the portion of 319 is a link that can be provided instead of the token at 318.

The chat text 320 can include portions 322-328. The chat text 320 is provided via the chat session 106(2). The portion 322 of "user:" indicates that the chat application instance 112(2) is transmitting the chat text 320 (as it is addressed to the chat bot 102(2) as indicated by 324). The chat text 326 indicates that the token is provided at 328. The chat text 320 is an example of a response that references the authentication credentials. In other embodiments, a different response can be provided using the chat text 320 or via other methods, such as by confirmation of the authentication and/or by accessing a link.

The chat text 330 can include portions 332-336. As indicated by 332, the bot application 104 can transmit, via the chat bot 102(2), the chat text 330 to the chat session 106(2). The portion of 336 is a prompt for the user (as indicated by 334) to confirm the authentication of the chat bot 102(2). It is noted that in some embodiments, the chat text 330 can instead be transmitted to the chat session 106(1) by the chat bot 102(1). The chat text 330 is a prompt for the response that references the authentication credentials.

Figure 4:
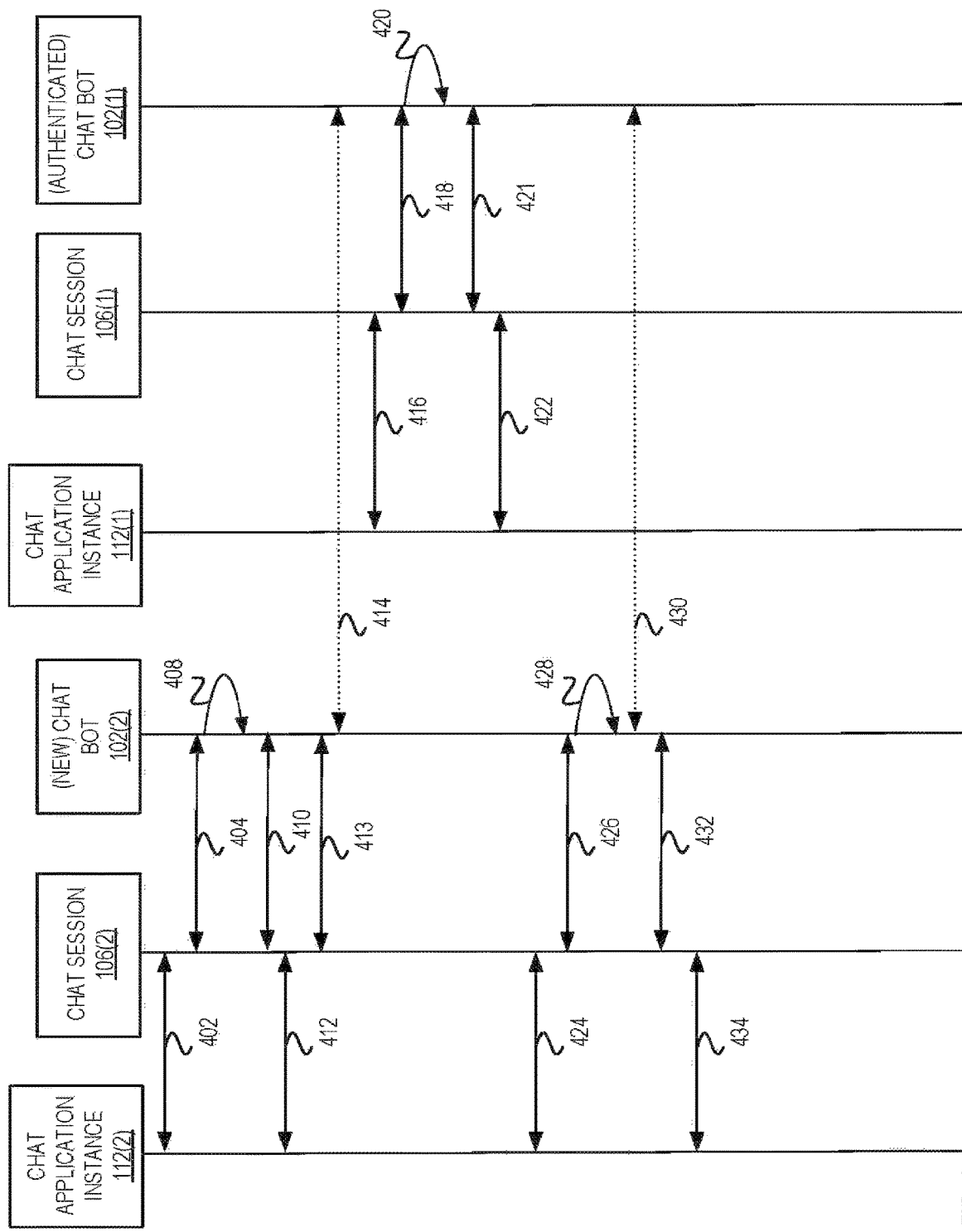
FIG. 4 is a timing diagram illustrating one embodiment of authentication of the additional chat bot at the additional chat session.

FIG. 4 is a timing diagram illustrating one embodiment of authentication of the additional chat bot at the additional chat session. As shown by FIG. 4, the chat application instance 112(1) and the chat bot 102(1) communicate with each other using a chat session 106(1). FIG. 4 indicates that the chat bot 102(1) is already authenticated with the transaction server. FIG. 4 indicates that the chat bot 102(2) is new, meaning that it is not yet authenticated with the transaction server. The communications of FIG. 4 can be performed over one or more communication networks. Portions of the timing diagram of FIG. 4 can correspond to the flow diagram of FIG. 2 and/or to the communication shown in FIG. 3. It is noted that not all of the communication between the chat bots and the chat application instances are shown. Furthermore, some of the communication shown is optional.

At 402, the chat application instance 112(2) can provide a chat text at the chat session 106(2). At 404, the chat bot 102(2) can access the chat text (provided at 402) at the chat session 106(2). At 408, the authentication server (e.g., the transaction server 116) can determine an intent to authenticate the chat bot 102(2), based on the chat text accessed at 404. At 410, the chat bot 102(2) can provide a chat text to the chat session 106(2) requesting an indication of whether the user is using another chat bot that is authenticated for accessing the user account. Since the transaction chat bot 102(2) is not yet authenticated, the transaction server may not have a record (e.g., a data entry in a database) indicating whether the user can access the user account using another chat bot (e.g., such as the chat bot 102(1)).

At 412, the chat application instance 112(2) can provide a chat text, to the chat session 106(2), indicating that the user uses the chat bot 102(1) for authenticated access to the user's account at the transaction server. In some embodiments, the chat text at 412 is provided automatically, e.g., by the chat application instance 112(2) in response to the chat text at 410. At 413, the chat bot 102(2) can access the chat text indicating the authenticated chat bot 102(1). At 414, the transaction server can determine (e.g., by accessing the database) that the authentication intent is to authenticate the chat bot 102(2) for the same user account that the chat bot 102(1) is already authenticated. In some embodiments, each of the chat bots 102(1) and 102(2) is an instance of a chat bot, and each chat bot instance is communicating via only one chat session at a time. It is noted that the one or more of the communication 402-413 are optional.

At 416, the chat application instance 112(1) can provide a chat text at the chat session 106(1). The chat text at 416 can indicate intent to authenticate the chat bot 102(2). At 418, the chat bot 102(1) can access the chat text (provided at 416) at the chat session 106(1). At 420, the chat bot 102(1) can determine an intent to authenticate the chat bot 102(2), based on the chat text accessed at 418. At 421, the chat bot 102(1) can provide authentication credentials, for authenticating the chat bot 102(2), at the chat session 106(1). At 422, the chat application instance 112(1) can access the authentication credentials from the chat session 106(1). At 424, the chat application instance 112(2) can provide a response, to the chat session 106(2), that references the authentication credentials. The response can be accessed at 426 by the chat bot 102(2). At 428, the transaction server can authenticate, based on the response, the chat bot 102(2). At 432, the chat bot 102(2) can provide a confirmation of the authentication. At 434, the confirmation can be accessed by the chat application instance 112(2).

It should be understood that FIGS. 1-4 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 2-4 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 5:
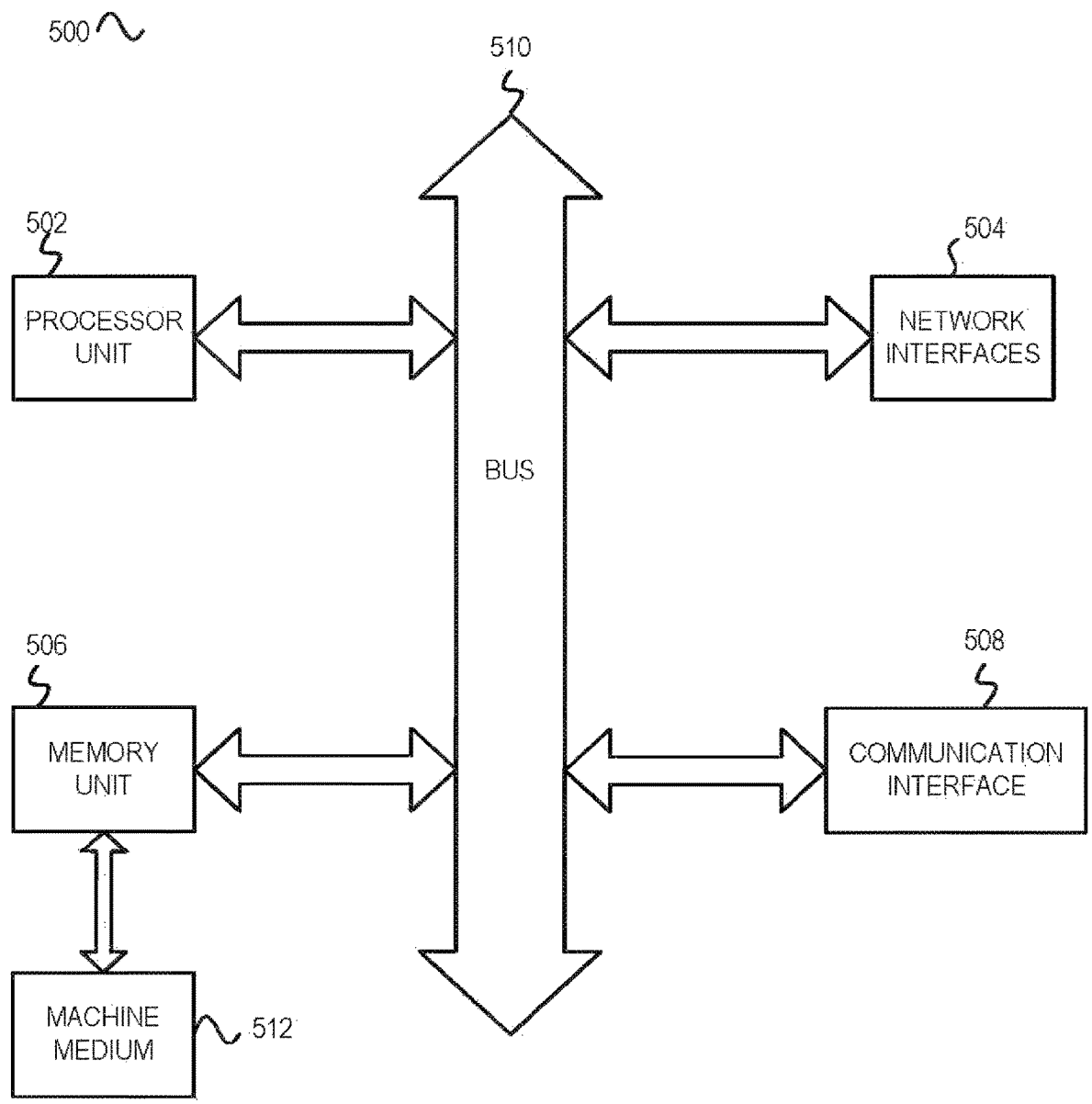
FIG. 5 is a block diagram of one embodiment of an electronic device used in the communication system of FIGS. 1 and 4.

FIG. 5 is a block diagram of an exemplary embodiment of an electronic device 500 including a communication interface 508 for network communications. The electronic device can embody functionality to implement embodiments described in FIGS. 1-4 above. In some implementations, the electronic device 500 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 500 can include a processor unit 502 (possibly including multiple processors, multiple cores, multiple nodes, and/or implementing multi-threading, etc.). The electronic device 500 can also include a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The electronic device 500 can also include the bus 510 (e.g., PCI, ISA, PCI-Express, HyperTransport®, InfiniBand®, NuBus, AHB, AXI, etc.), and network interfaces 504 can include wire-based interfaces (e.g., an Ethernet interface, a powerline communication interface, etc.). The communication interface 508 can include at least one of a wireless network interface (e.g., a WLAN interface, a Bluetooth interface, a WiMAX interface, a ZigBee interface, a Wireless USB interface, etc.), In some implementations, the electronic device 500 may support multiple network interfaces—each of which is configured to couple the electronic device 500 to a different communication network.

The memory unit 506 can embody functionality to implement embodiments described in FIGS. 1-4 above. In one embodiment, the memory unit 506 can include one or more of functionalities that facilitate communicating in chat sessions using chat bots for authentication of additional chat bots. Any one of these functionalities may be partially (or entirely) implemented in hardware and/or on the processor unit 502. For example, some functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, the network interface 504 and the communication interface 508 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the present disclosure is not limited to them. In general, techniques for using chat bots as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for authentication of chat bots, the method comprising:
  accessing a first chat session via a first chat bot authenticated for accessing a user account, of a user, at a transaction server, the first chat session hosted by a first social media service, the first chat bot simulating a first user-operated chat application instance for communicating in the first chat session of the first social media service with the user;

determining an authentication intent to authenticate a second chat bot to access the user account via a second chat session, the second chat bot simulating a second user-operated chat application instance for communicating in the second chat session of a second social media service with the user; and authenticating, based at least on the first chat bot being authenticated for accessing the user account and the authentication intent, the second chat bot for accessing the user account via the second chat session of the second social media service.

2. The method of claim 1, further comprising:

determining that the first chat bot communicates with the user via a first chat application instance executing on a user device of the user; and determining that the second chat bot communicates with the user via a second chat application instance executing on the user device of the user;

wherein the authenticating is further based on the determination that both the first chat bot and the second chat bot communicate with the user via the respective chat application instances on the user device.

3. The method of claim 1, wherein the first chat session is for a transaction initiated by the user, the method further comprising moving the transaction from the first chat session to the second chat session.

4. The method of claim 3, wherein the transaction is between the user and a merchant, wherein the transaction server facilitates a payment between the user and the merchant for the transaction.

5. The method of claim 1, wherein the determining of the authentication intent is determined based on content of a user provided text by the user in one of a first chat application instance and a second chat application instance, wherein the first chat bot communicates with the user via the first chat application instance and the second chat bot communicates with the user via the second chat application instance.

6. The method of claim 1, wherein the authenticating the second chat bot comprises:

providing authentication credentials to the transaction server to authenticate the second chat bot for access to the user account.

7. The method of claim 1, wherein the authenticating the second chat bot comprises:

providing authentication credentials including a one-time token for use at the second chat session at a second chat application instance.

8. The method of claim 1, wherein the transaction server hosts the first chat bot and the second chat bot.

9. The method of claim 1, further comprising:

accessing a response that references authentication credentials provided to the transaction server by the first chat bot for the authenticating; and determining, based on the response, that a first chat application instance and a second chat application instance are both hosted by a user device, wherein the first chat bot communicates with the user via the first chat application instance and the second chat bot communicates with the user via the second chat application instance.

10. A system comprising:

a non-transitory memory storing instructions; and a processor configured to execute the instructions to cause the system to:

provide, to a first chat bot and via a first chat session, an authenticated access to a user account at a transaction server, the first chat session hosted by a first social media service, the first chat bot for communicating via the first social media service with a first chat application instance accessed by the user;

determine an authentication intent to authenticate a second chat bot to access the user account via a second chat session with a second chat application instance, the second chat bot for communicating in the second chat session of a second social media service with the user; and authenticate, based at least on the first chat bot being authenticated for accessing the user account and the authentication intent, the second chat bot for accessing the user account via the second chat session of the second social media service.

11. The system of claim 10, wherein executing the instructions further causes the system to:

determine that the first chat bot communicates with the user via a first chat application instance executing on a user device of the user; and determine that the second chat bot communicates with the user via the second chat application instance executing on the user device of the user;

wherein the authenticating is further based on the determination that both the first chat bot and the second chat bot communicate with the user via the respective chat application instances on the user device.

12. The system of claim 10, wherein the first chat session is for a transaction initiated by the user; wherein executing the instructions further causes the system to move the transaction from the first chat session to the second chat session.

13. The system of claim 10, wherein the determining of the authentication intent is determined based on content of a user provided text by the user in one of a first chat application instance and a second chat application instance, wherein the first chat bot communicates with the user via the first chat application instance and the second chat bot communicates with the user via the second chat application instance.

14. The system of claim 10, wherein the authenticating the second chat bot comprises providing authentication credentials to the transaction server to authenticate the second chat bot for access to the user account.

15. The system of claim 10, wherein executing the instructions further causes the system to:

access a response that references authentication credentials provided to the transaction server by the first chat bot for the authenticating; and determine, based on the response, that a first chat application instance and the second chat application instance are both hosted by a user device, wherein the first chat bot communicates with the user via the first chat application instance and the second chat bot communicates with the user via the second chat application instance.

16. A non-transitory machine-readable medium having instructions stored thereon, the instructions executable to cause performance of operations comprising:

providing, to a first chat bot and via a first chat session, an authenticated access to a user account at a transaction server, the first chat session hosted by a first chat service, the first chat bot for communicating via a first social media service with a first chat application instance accessed by the user;

determining that the user is accessing a second chat session that is hosted by a second chat service; and determining, based on the user access via the second chat session and on the authenticated access to the user account for the first chat bot, to provide additional authenticated access to the user account to a second chat bot, the second chat bot for communicating in the second chat session with the user.

17. The non-transitory machine-readable medium of claim 16, wherein the first chat session is for a transaction initiated by the user, wherein the operations further comprise moving the transaction from the first chat session to the second chat session.

18. The non-transitory machine-readable medium of claim 16, wherein the operations further comprise:

determining that the first chat bot communicates with the user via a first chat application instance executing on a user device of the user; and determining that the second chat bot communicates with the user via a second chat application instance executing on the user device of the user;

wherein the determining to provide additional authenticated access authenticating is further based on the determination that both the first chat bot and the second chat bot communicate with the user via the respective chat application instances on the user device.

19. The non-transitory machine-readable medium of claim 16, wherein the operations further comprise authenticating the second chat bot including providing a one-time token for use at the second chat session via a second chat application instance accessible by the user.

20. The non-transitory machine-readable medium of claim 16, wherein the transaction is between the user and a merchant, wherein the transaction server facilitates a payment between the user and the merchant for the transaction.

* * * * *